(12) United States Patent
Nathan et al.

(10) Patent No.: US 6,326,957 B1
(45) Date of Patent: Dec. 4, 2001

(54) SYSTEM AND METHOD FOR DISPLAYING PAGE INFORMATION IN A PERSONAL DIGITAL NOTEPAD

(75) Inventors: Krishna S. Nathan, New York; Michael P. Perrone, Yorktown, both of NY (US); John F. Pitrelli, Danbury, CT (US); Eugene H. Ratzlaff, Hopewell Junction; Jayashree Subrahmonia, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,213

(22) Filed: Jan. 29, 1999

(51) Int. Cl.[7] ........................................ G09G 5/00
(52) U.S. Cl. .................... 345/179; 345/178; 345/173
(58) Field of Search ..................... 345/179, 121, 345/123, 125, 173; 382/187; 178/18.01, 18.03, 18.05, 18.06, 18.07, 19.01, 19.03, 19.04

(56) References Cited

U.S. PATENT DOCUMENTS

| 4,720,703 | * | 1/1988 | Schnarel, Jr. et al. | 345/121 |
|---|---|---|---|---|
| 4,744,046 | * | 5/1988 | Foster | 345/28 |
| 5,038,138 | * | 8/1991 | Akiyama et al. | 345/123 |
| 5,331,335 | * | 7/1994 | Iida | 345/133 |
| 5,434,953 | * | 7/1995 | Bloomberg | 345/439 |
| 5,454,046 | * | 9/1995 | Carman, II | 382/186 |
| 5,459,796 | * | 10/1995 | Boyer | 345/326 |
| 5,524,201 | * | 6/1996 | Shwarts et al. | 345/326 |
| 5,561,446 | * | 10/1996 | Montlick | 345/173 |
| 5,587,560 | * | 12/1996 | Crooks et al. | 178/18 |
| 5,612,720 | * | 3/1997 | Ito | 345/179 |
| 5,627,349 | * | 5/1997 | Shetye et al. | 178/18 |
| 5,680,152 | * | 10/1997 | Bricklin | 345/121 |
| 5,680,636 | * | 10/1997 | Levine et al. | 707/512 |
| 5,714,972 | * | 2/1998 | Tanaka et al. | 345/121 |
| 5,734,129 | * | 3/1998 | Belville et al. | 178/18 |
| 5,739,814 | * | 4/1998 | Ohara et al. | 345/173 |
| 5,765,176 | * | 6/1998 | Bloomberg | 707/514 |
| 5,838,819 | * | 11/1998 | Ruedisueli et al. | 345/179 |
| 5,850,211 | * | 12/1998 | Tognazzini | 345/158 |
| 6,002,799 | * | 12/1999 | Sklarew | 382/189 |
| 6,041,137 | * | 3/2000 | Van Kleeck | 382/185 |
| 6,052,117 | * | 4/2000 | Ohara et al. | 345/173 |
| 6,054,990 | * | 4/2000 | Tran | 345/358 |
| 6,055,552 | * | 4/2000 | Curry | 707/530 |
| 6,144,371 | * | 11/2000 | Clary et al. | 345/173 |
| 6,144,380 | * | 11/2000 | Shwarts et al. | 345/350 |

* cited by examiner

Primary Examiner—Jeffery Brier
Assistant Examiner—Ryan Yang

(57) ABSTRACT

System and methods for visually displaying page information in a handwriting recording device such as a personal digital notepad (PDN) device, in which constraints exist which limit the size of a user interface display (e.g. LCD). Various methods allow a user to view detailed page information by selecting one or more available display modes which display the selected information using one or more dynamic icons. In addition, the user can view (via the display) selected portions of handwriting content of a given electronic page, thereby affording the user the opportunity to synchronize the stored handwriting data with the handwritten text.

37 Claims, 4 Drawing Sheets

SYSTEM AND METHOD FOR DISPLAYING PAGE INFORMATION IN A PERSONAL DIGITAL NOTEPAD

BACKGROUND

1. Technical Field

The present invention relates generally to handwriting recording devices for real-time digitization of handwritten text and, more particularly, to system and methods for displaying page information such as handwriting data content in a handwriting recording device.

2. Description of Related Art

There are a variety of handwriting recording devices which digitize and electronically capture handwritten text in real-time as the text is written. Typically, these conventional handwriting recording devices utilize a digitizing tablet in conjunction with an electronic stylus (i.e., pen) to record handwriting data. The digitizing tablet generates positional data representing the coordinates of the electronic stylus by detecting, for example, RF (radio frequency) signal emissions generated by the stylus as a user applies the stylus on or near to the surface of the tablet.

One type of handwriting recording device is a personal digital notepad (PDN) device. The PDN device includes an electronic stylus having an inking tip which allows the user to write on a piece of paper placed over the digitizing tablet while the PDN records handwriting strokes (by detecting positional data). The stylus typically includes a pressure sensor which generates a "pen down" signal when the stylus is in contact with the writing surface. This signal is usually conveyed to the digitizing tablet via a dedicated line or through a secondary RF emission. Accordingly, by monitoring the pen down signal and the path of the radio emission of the stylus as it move across the radio sensitive grid, the digitizing tablet may generate a data stream representing the pen strokes that comprise the text written on, or in close proximity to, the surface of the digitizing tablet. It is to be understood that the term "stroke" used herein refers to a group of is handwriting data which is recorded between a "pen-down" signal and a "pen-up" signal.

For purposes of user convenience and saving space, PDN devices are generally built as small as possible. One constraint, however, which limits the physical size of the PDN device is the paper size (i.e., form factor) used in conjunction with the PDN. For instance, the writing surface area of the PDN for use with standard 8.5"×11" paper cannot be smaller than the surface area of such paper. Another constraint which limits the size of the PDN device is the addition of a user interface (UI) or device status display (such as a liquid crystal display (LCD)) which is to provide status information and allow the user to select menu options for accessing certain functions. In order to keep the size of the PDN device at a minimum, the area of the LCD must be minimized.

The size of the LCD display of the PDN device is also constrained by its power usage. Users typically require a PDN device to have a long battery life. Accordingly, an increased battery life can be obtained by minimizing the size and, thus, power usage of the LCD screen.

The are various problems that result from the constraints which limit the LCD size of PDN devices. One problem is that a small LCD display limits the method by which detailed page and status information of the PDN can be provided via the display, thereby making it difficult for the user to access desired information. For example, due to the size constraints of the LCDS, currently available PDN devices are not designed to display the handwriting content (or "digital ink") recorded on any given digital page. Consequently, it is relatively easy for the user to forget which handwritten page in a paper notepad corresponds to which numbered digital page in the PDN, which may result in the user overwriting recorded handwriting data on a given digital page.

SUMMARY

The present application is directed to a system and methods for visually displaying page information in a handwriting recording device such as a personal digital notepad (PDN) device, in which constraints exist which limit the size of a user interface display (e.g. LCD). The present invention allows a user to view page information by selecting one or more available display modes which display the selected information using one or more dynamic icons. In addition, the user can view (via the display) selected portions of handwriting content of a given digital page, thereby affording the user the opportunity to synchronize the stored digital ink with the handwritten text.

In one aspect of the present invention, a dynamic icon is displayed which represents a scaled-down (i.e, thumbnail) version of the structure of the ink content of a digital page.

In another aspect of the present invention, a handwritten page is placed on the PDN and the user can utilize the stylus as "wand" to display a panning view of ink content for a current digital page as the stylus passes over portions of the handwritten page. In this manner, the user can then synchronize a handwritten page with a digital page by comparing the displayed ink with the handwritten ink of the handwritten page which is in proximity to the stylus. another aspect of the present invention, a predefined number of strokes which are recorded at the beginning or end of a digital page are displayed. In this manner, a user can compare the displayed words with the handwritten words at the beginning or end of a handwritten page.

These and other aspects, features and advantages of the present invention will be described and become apparent from the following detailed description of preferred embodiments, which is to be read in connection with the accompanying drawings.

DESCRIPTION OF PREFERRED EMBODIMENTS

It is to be understood that the present invention may be implemented in any conventional handwriting recording device such as a PDN (or other similar devices) in which practical constraints limit the size of a user interface display (e.g., LCD). Notwithstanding that the invention described herein may be employed in various devices, for purposes of illustration, the invention will be described in relation to the personal digital notepad (PDN) device which is disclosed in U.S. patent application Ser. No. 08/747,735 entitled: "Methods, Systems and Products Pertaining To A Digitizer For Use In Paper Based Record Making Systems" filed on Nov. 12, 1996, which is incorporated herein by reference.

Figure 1:
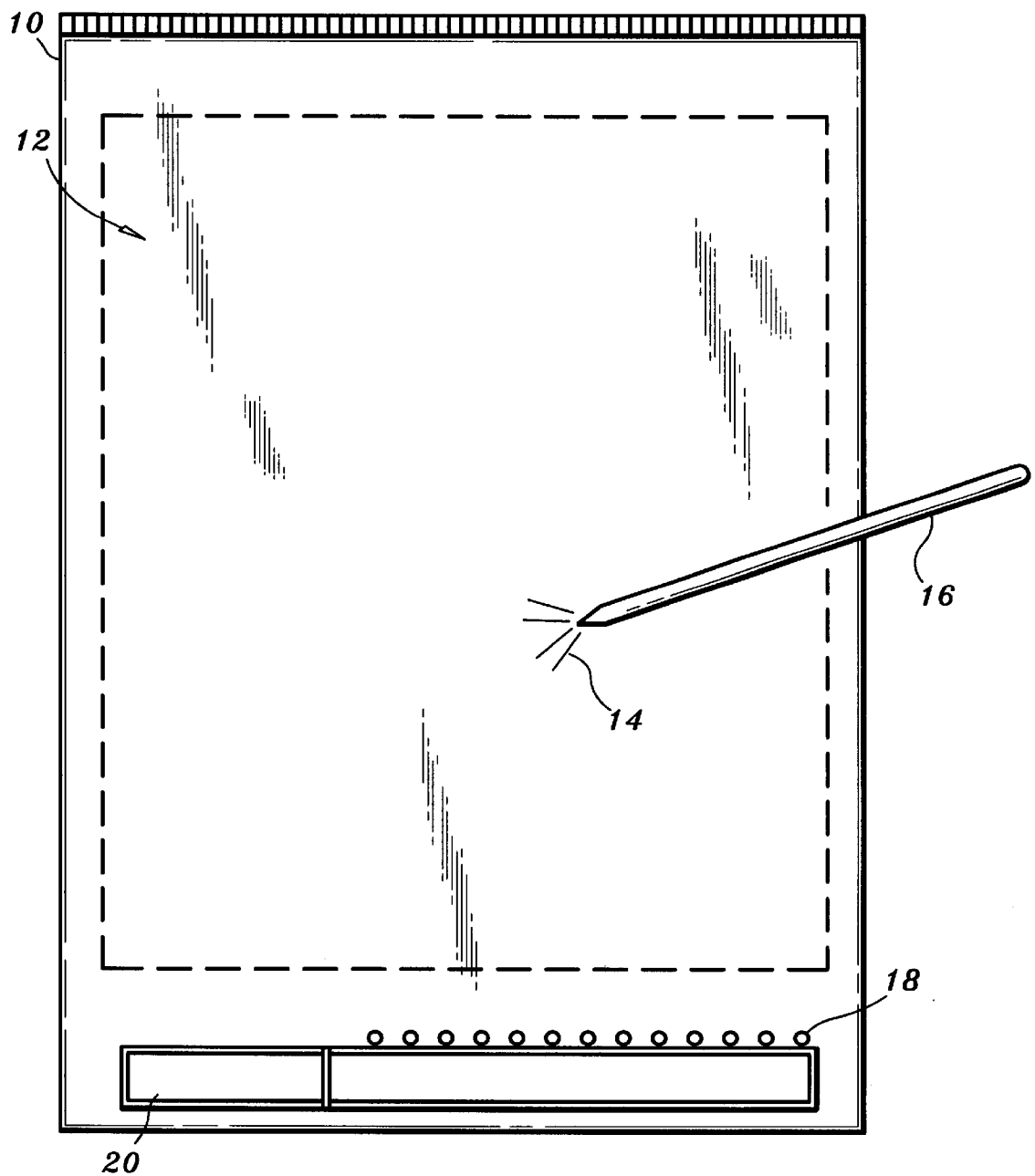
FIG. 1 is a diagram illustrating a handwriting recording device in which the present invention may be implemented.

One currently available embodiment of the PDN device disclosed in the above incorporated U.S. Ser. No. 08/747,735 is sold under the name CROSSPAD and marketed by the A.T. Cross company. The CROSSPAD PDN device allows a user to record handwritten information on a standard paper notepad and simultaneously record an electronic carbon copy of the writing. Referring now to FIG. 1, a diagram illustrates a PDN device such as disclosed in U.S. Ser. No. 08/747,735, in which the present invention may be implemented. The PDN device includes a housing 10 having an handwriting recording area 12 (i.e., active area) which overlies a digitizing tablet (the outline of which is by the broken lines). The PDN may be designed in one of a variety of sizes to accommodate a given paper size (form factor). For instance, the digitizing tablet may be provided such that a portion of the active area 12 has a form factor to match, e.g., a standard paper size (8.5×11 inches) or standard check book size.

The digitizing tablet receives electromagnetic signals 14 from an RF coupled inking stylus 16 as the user writes on a piece of paper (placed over the digitizing tablet active area 12) with the inking stylus. A data stream representing the handwriting strokes produced in ink on the paper is generated by the digitizing tablet. As a given page is filled with handwritten strokes, the data stream is recorded, effectively creating a record of the entire page of handwritten notes in the order in which they are written. In this manner, the PDN generates an electronic carbon copy of handwritten text and stores the recorded data stream. The handwriting data may be stored in any suitable conventional format such as a bitmap image or as a sequence of X-Y coordinates which represent the location of a pen writing tip on the digitizing tablet at successive points in time. The recorded handwriting data may subsequently be uploaded to another computer system for decoding and recognizing the recorded handwriting data.

The digitizing tablet may also include several "soft buttons." A soft button in an area within the active area 12 of the digitizing tablet which is predefined to indicate a specific input value when stroke information is detected within the soft button area. In the illustrated embodiment, a plurality of soft buttons 18 are provided in a horizontal row near the bottom of the PDN. The soft buttons 18 may be located in any active portion of the digitizing tablet, and their locations may be designated by default or through a user customization procedure. The function of the soft button may be indicated with an icon or legend. When pen stroke data is detected as occurring within the predefined area of the soft button, the routine associated with the soft button event is automatically executed by the system.

The PDN device also includes an LCD display screen 20 which is used to display user prompts and other information. As illustrated, the LCD 20 of the PDN is significantly smaller in relation to the active area 12 of the digitizing tablet. This physical characteristic limits the amount of page information that may be displayed, as well as method by which such information is displayed. For instance, the CROSSPAD is currently configured to display a page icon which displays the page number of the digital page and indicates whether a digital page contains any handwriting data (ink). This is performed by displaying either a blank page icon to indicate that no ink is recorded on the digital page or a page icon having lines to indicate that there is recorded ink on the page.

This configuration has several drawbacks. For instance, the displayed lines of the page icon do not indicate, however, the amount or the structure of the ink which is recorded on any given digital age. In addition, the displayed page number does not always allow a user to synchronize a digital page with a handwritten page. For example, a user can produce a first set of handwritten records denoted as pages 1-10 in a notebook and have the corresponding digital pages internally labelled 1–10. However, if the user produces a second set of handwritten records in a separate notebook with hand-labelled pages 1–10, the corresponding digital pages will be internally labelled 11–20 (assuming the user does not begin at internal page 1 and erase the ink content of the digital pages), thereby making it difficult for the user to visually synchronize a handwritten page number with an internally labelled page number.

The present invention provides methods for visually displaying detailed page information such as ink content and/or ink structure of a digital page in consideration of the size constraints of the LCD 20. Advantageously, these methods allow significantly detailed page information to be displayed such that a user can easily synchronize a handwritten page with a stored digital page in PDN. One such method includes displaying a dynamic icon on the LCD 20 which represents a scaled-down (i.e, thumbnail) version of the structure of the digital ink on any digital page. Another method involves placing a handwritten page on the PDN and using the stylus as "wand" to display a panning view of ink content for a digital page on the LCD 20 as the stylus passes over portions of the handwritten page (without making contact with the page). The user can then synchronize a handwritten page with a current digital page by comparing the displayed digital ink with the handwritten ink on the portion of the handwritten page which is in proximity to the stylus. The present invention also includes a method for displaying a predefined number of initial strokes or final strokes which are recorded on a current digital page. In this manner, the user can compare either the beginning or ending words of a handwritten page with the displayed initial and final recorded strokes, respectively, of the current digital page. Each of the above methods, as well as other methods, for displaying page information and status information will be discussed in further detail below.

Figure 2:
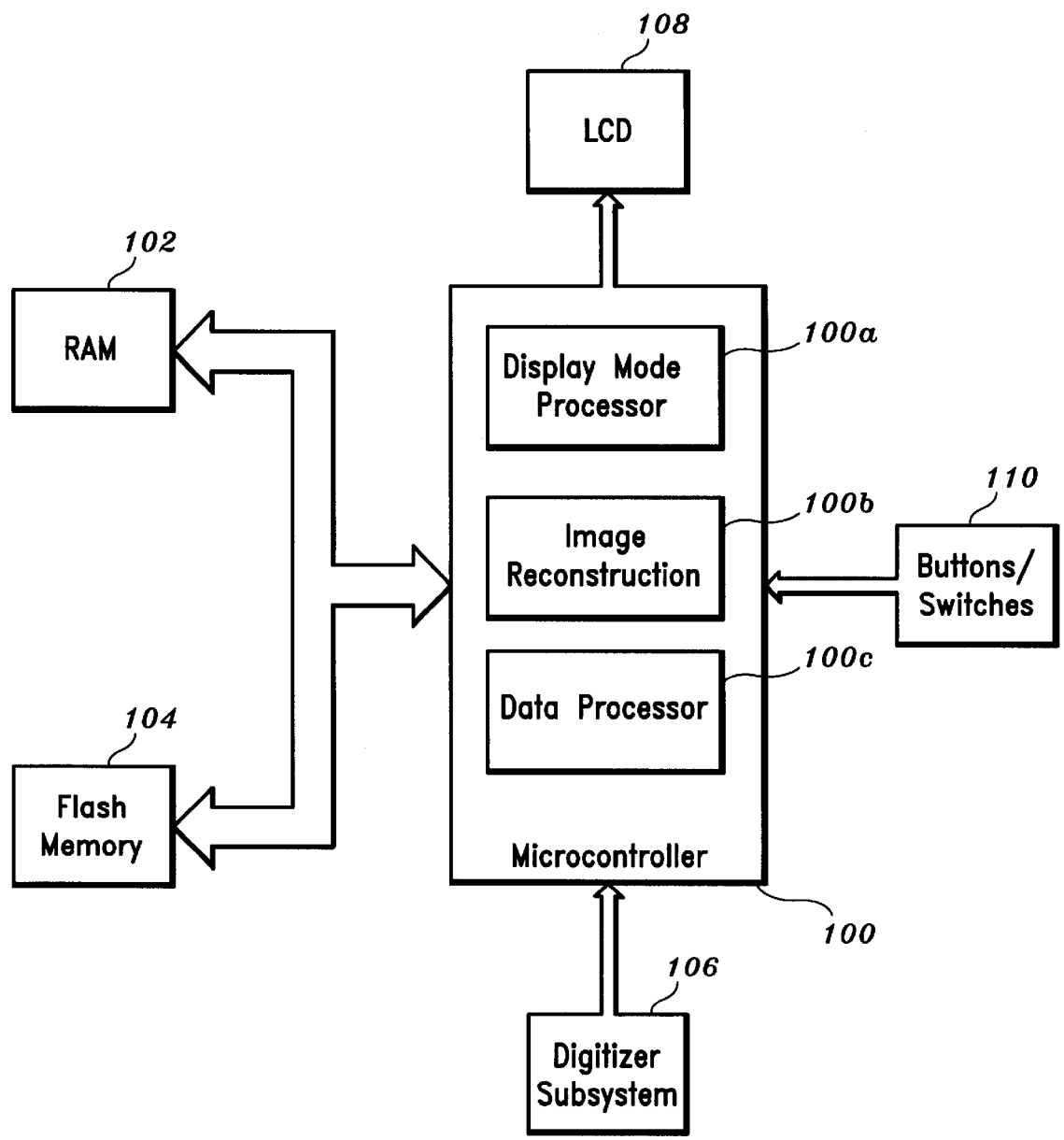
FIG. 2 is a general block diagram of a system which may be implemented in the device of FIG. 1 for visually displaying page information in accordance with one embodiment of the present invention.

Referring now to FIG. 2, a block diagram illustrates a system for visually displaying page information and/or status information in accordance with one embodiment of the present invention, which can be implemented in the PDN device of FIG. 1. It is to be noted the system depicted in FIG. 2 is a general representation of elements that are used for implementing the present invention. A microcontroller 100 controls the overall operation of the system. The system includes nonvolatile memory 104 (e.g., flash memory) and may include volatile memory 102 (e.g., random access memory (RAM)), which are connected to the microcontroller 100. A digitizer subsystem 106 includes appropriate digitizing hardware and an electromagnetic sensor (not shown) for detecting and collecting stroke and event data under the control of microcontroller 100.

A plurality of buttons/switches 110 (e.g. soft buttons and/or hardwired buttons and switches) are employed in accordance with the present invention for directly accessing and implementing various display modes described herein for displaying page and/or status information. Alternatively, the user can invoke one or more display mode functions by actuating a corresponding soft or hardwired button to display a "display mode menu" on the LCD 108, whereby the user can select one or more desired display modes by toggling a designated button or switch.

It is to be understood that the various display mode functions described herein in accordance with the present invention may be implemented by the microcontroller 100 under the control of appropriate software or microinstruction code. For instance, a display mode 100a invokes one or more routines for displaying page and/or status information in accordance with the user selection. In addition, a data processing module 100a utilizes certain microinstructions for generating a digital record of the data stream generated by the digitizing subsystem 106, and storing the digitized record in memory 104 as the data stream is produced. The data processor module 100c operates to retrieve a recorded data stream (data file) from memory 104 and process the data file to separate and catalogue the sequentially recorded stroke and event data. An image reconstruction module 100b uses the stroke and event data from the data processor 100c to reconstruct and display an image of the recorded ink in accordance with the user-selected display mode.

A detailed description of methods for visually displaying detailed page and/or status information in accordance with the present invention will now be discussed. Referring to the diagrams of FIGS. 3a and 3b, a method is illustrated for displaying the structure of recorded ink of a digital page in accordance with one aspect of the present invention. This method involves displaying a dynamic icon on the LCD 20 which represents a scaled-down (i.e, thumbnail) version of the recorded ink of a given digital page. Advantageously, this method allows a user synchronize a digital page with a handwritten page by comparing the ink structure, i.e., the relative spatial location of the ink, shown in the displayed icon with the ink structure of a given handwritten page.

Figure 3A:
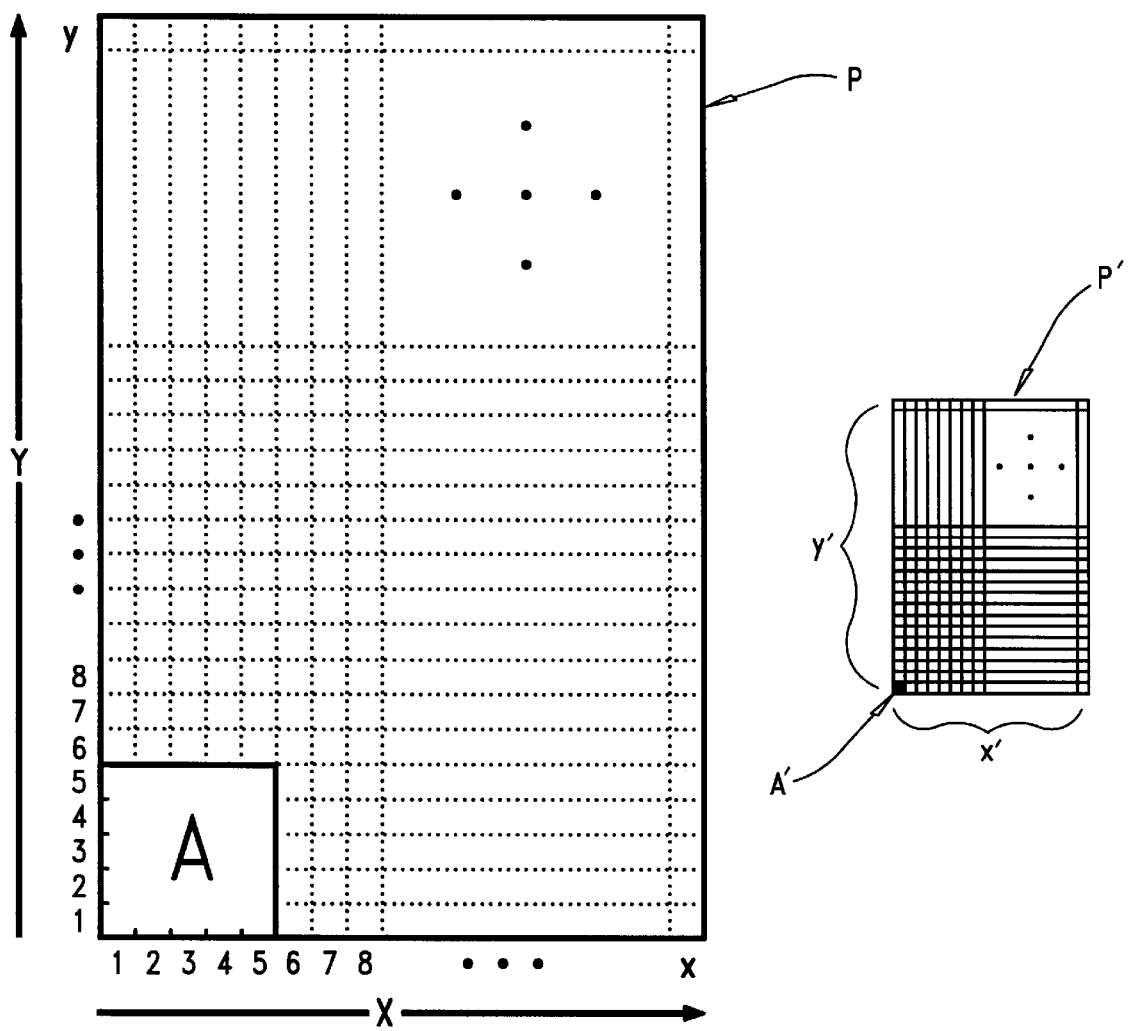
FIGS. 3a and 3b are diagrams which illustrate a method for visually displaying page content in accordance with one aspect of the present invention.

Initially, referring to FIGS. 2 and 3a, the user will enter the thumbnail display mode (via the display mode processor 100a) by actuating a designated button or selecting from a menu. The user would then select a digital page in memory 104 (by toggling a designated button). The digital ink for the selected digital page is then processed (via the data processor module 100c) by reading the recorded positional data. From the positional data, the PDN (via the image reconstruction module 100b) can detect if there is recorded ink in each sub-area of the digital page P which, as illustrated, includes a total of (x)×(y) sub-areas. A scaled-down version of the digital page P can then be represented by a dynamic icon P' having an area of (x')×(y') pixels, wherein each pixel is designated to a preselected number sub-areas ("designated area") as illustrated by area "A" of the digital page.

Figure 3B:
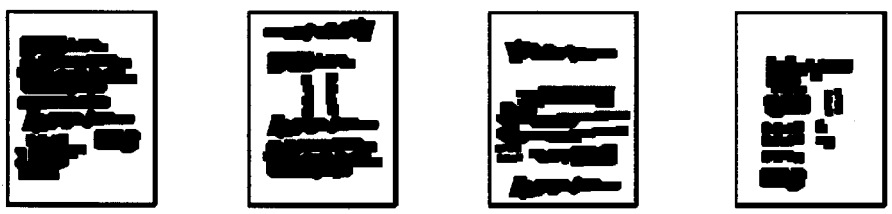

A thumbnail representation of the ink structure of the digital page P is then generated by activating each pixel of the dynamic icon P' having a designated area of the digital page which contains recorded ink. Each pixel having a designated area with no recorded ink will not be activated. By way of example, referring to FIG. 3a, a pixel A' of the thumbnail icon P' is designated to area A of digital page P which occupies 25 sub-areas of the digital pege P. If any recorded ink is detected in the area A, the pixel A' would be activated. In this manner, the dynamic icon can then be displayed to provide the user with information regarding the ink structure for a digital page can be displayed. The diagrams of FIG. 3b illustrate examples on how the displayed icon may appear for different digital pages.

It is to be appreciated that a thumbnail representation of the ink structure of the digital page P can also be generated using gray scale imaging techniques. In this situation, the system will tally the number of sub-areas for each designate area A of the digital Page having ink recorded therein. A thumbnail representation of the ink structure of the digital page P is then generated by activating each pixel of the dynamic icon P' in accordance with a gray scale factor based on the percentage of sub-areas of the pixel's designated area having recorded ink. Advantageously, a gray scale thumbnail version can provide more detailed information regarding the ink structure of a given digital page.

It is to be appreciated that the amount of differentiation provided by this method depends on how many pixels are used to define the icon, as well as the scaling resolution (i.e., the number of sub-areas designated to a particular pixel). It is to be further appreciated that the thumbnail representation of a digital page may be dynamically displayed, whereby the displayed thumbnail icon is continually updated as the user writes on the page.

Figure 4:
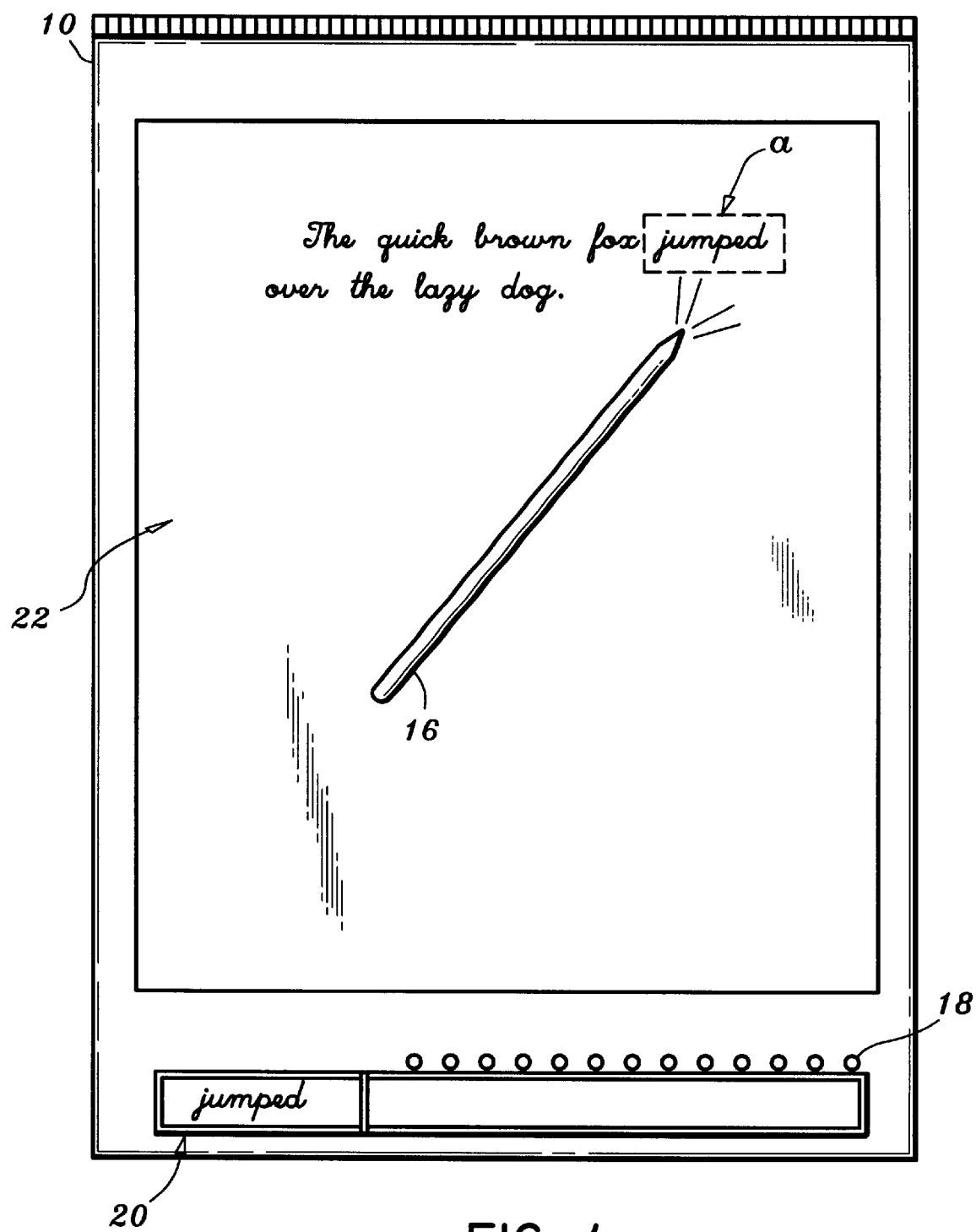
FIG. 4 is a diagram which illustrates a method for visually displaying page content in accordance with another aspect of the present invention.

Referring now to FIG. 4, a diagram illustrates a method for displaying page information in accordance with another aspect of the present invention. With this method, a user can select (via the display mode function menu or actuating a designated button) a "panning mode" display option, whereby the entire LCD 108 or a portion of the LCD 108 is utilized for displaying a panning view of a portion of the recorded ink of a digital page. As illustrated in FIG. 4, the user may place a handwritten page 22 over the surface of the digitizing tablet. The user can then move the tip of the pen 16 over the page 24 as the digitizing tablet detects the location (i.e., coordinates) of the pen (assuming of course that the pen is within a prespecified radio frequency threshold limit distance from the page, but not touching and inking the page). The detected pen location is then used to access the recorded ink in the corresponding location of the current digital page. Then, a bitmap image of the recorded ink in that location of the current digital page is then displayed on the LCD 20.

It is to be understood that the electronic pen operates with two frequencies: one frequency (or pattern of frequencies) is emitted during a "spen down" or "inking" state, whereby the digitizing tablet detects the RF emissions and records the handwriting strokes; and a second frequency (or pattern of frequencies) is emitted during an "on" state whereby the digitizing tablet is detecting RF emissions from the pen but is not recording stroke data. Accordingly, the PDN operates in the "On" state for implementing the panning display mode.

By way of example with reference to FIG. 4, a detection area (as defined by the dotted lines and denoted as "a") is detected, and the recorded ink in that detected area "jumped" is displayed in the LCD 20. Since the handwritten word "jumped" (within detection area "a") is similar to the displayed word, the user can conclude that digital page corresponds to the handwritten page.

It is to be appreciated that the detection area "a" can be generated by determining the coordinates of the pen (pen location) having the greatest detected RF magnitude, and then forming a bounding area around the detected location using predefined values. For instance, the location area can be predefined to be a one inch by one inch box (1"×1") with the center of the predefined box being the pen location (having the greatest detected magnitude). In this manner, depending on the size of the predefined detection area "a" and the designated size of the display, it is to be appreciated that the displayed ink may be actual size or may be scaled by some predetermined value to show more or less of the page. For instance, if the size of the detection area "a" is 1"×1" and the designated area of the LCD for the panning mode is 1 cm×1 cm, then the recorded image within the detection area can be scaled down accordingly to fit within the designated portion of the display.

Another method for displaying page information in accordance with the present invention involves displaying a predetermined number "n" of initial recorded strokes of a digital page. Alternatively, a predetermined number "n" of recorded strokes at the end of the digital page can be displayed. As with the above display mode options, this display mode may be selected via the display mode function menu or by actuating a designated button or switch. A selected digital page would be obtained from memory 104. The data processor module 100c would extract and process the recorded ink corresponding to the predetermined number of "n" strokes which the system is programmed to display. The image reconstruction module would reconstruct and display bitmap image(s) of the recorded ink.

If the system is configured to display a significant number "n" of stroke entries, the user can toggle between the displayable information for a given page, which would then become static after each of the "n" entries are displayed. Alternatively, the scaled-down bitmap images (e.g., words) can be constructed as discussed above such that several words may be simultaneously displayed. This display mode allows the user to synchronize a digital page with a handwritten page by comparing recorded ink at the beginning or end of the digital page with ink on the handwritten page.

In another embodiment, the user can select a display mode option which displays the number of recorded strokes for any given page. In particular, the user can toggle between the recorded digital pages and have the number of strokes displayed on the LCD for each digital page. With this information, the user can synchronize a handwritten page with a digital page by using the number of strokes to determine the quantity of recorded ink on a selected digital page.

In another embodiment of the present invention, page information may be accessed by selecting a display mode option which uses "keywords" to provide page content information to the user ("keyword display mode"). A keyword can be one word or a group of words which are previously selected by the user during the production of the handwritten record. Specifically, a keyword is a group of ink strokes which are selected by the user and electronically tagged as a single unit via a soft button. A keyword is typically selected by a user to represent key concepts or ideas for a given paragraph or page. Using the recorded keywords, a user can visually obtain page content information from the LCD in one of several ways.

For instance, the system can be configured to display the number of previously designated keywords for a given digital page. The data processor module 100c would process a selected digital page to determine the number of designated keywords on the digital page. The user toggle between the digital pages to view the displayed keyword number for each digital page. By knowing the number of keyword designations for a given handwritten page, the user can find the corresponding digital page by finding the digital page having the same number of keywords as the handwritten page.

In addition, the keyword display mode can be implemented by displaying a bitmap image of the keywords associated with a current digital page. In particular, for a given keyword on a current digital page, the image reconstruction module 100b can generate a bitmap image of the stroke data which is tagged as the keyword. This reconstruction process (and scaling method) is similar to the process discussed above in connection with the panning mode. Accordingly, by toggling between keywords (if any) of a given page, the user can sequentially view the word or words associated with a given keyword and compare the displayed keywords with the handwritten text.

In accordance with another embodiment of the present invention, the user can select a display mode option which displays the number of previously designated bookmarks of a digital page ("bookmark display mode"). In this manner, a bookmark icon can be displayed to inform the user if, and how many, bookmarks are associated with the current page.

In accordance with yet another embodiment of the present invention, the user can select a display mode option that displays a bitmap image of a page number written in a page number box ("page number display mode"). With this method, a page number box can be designated a predefined region of the handwritten page in which the user will handwrite a desired page number which is recorded. In this manner, the user can view the recorded page number of a digital page and compare the displayed number with the handwritten page number on a handwritten page. Again, the reconstruction and scaling process is similar to those discussed above in connection with the panning mode.

A further embodiment of the present invention allows the user to view X and Y coordinates, i.e., the positional location of the stylus as detected by the digitizing tablet. This feature provides reproducibility, i.e., the user can place the handwritten page on the digitizing tablet in the same location if, for instance, the page falls off the tablet or the user temporarily removes the paper. For example, the user can register two or more locations on the handwritten record, i.e., assign an x-y coordinate to certain handwritten text, which enable the user to place the handwritten paper on the digitizing tablet and align the paper until the stylus detects the coordinates corresponding to the handwritten text.

In addition, the system can be configured to "remember" the x-y coordinates of the last recorded stroke for a given digital page. The last recorded position information may be stored automatically or manually by the user. This novel feature is applicable, for instance, when the user want to continue writing on a previous handwritten page but avoid overwriting any recorded ink (i.e., begin recording additional ink starting from the last recorded location). In this manner, the LCD would display the current coordinates of the stylus as well as the stored coordinates of the last recorded ink as the stylus moves over the handwritten page (placed on the digitizing tablet) to enable the user align the last recorded position with the desired position on the handwritten page. In addition, the system can be configured to display one or more arrows on the LCD to indicate the direction in which the user should move the stylus to reach the last recorded position.

In accordance with another embodiment of the present invention, the LCD may be utilized to remind a user to advance a page number. Currently, the CROSSPAD is configured to associate a page identifier with recorded stroke data for a given handwritten page upon the occurrence of a "new page event." The term event refers to an occurrence which is assigned a predefined meaning. A "new page event" may be invoked by the user by actuating a switch or a soft button or some other means. Upon detection of a new page event, the PDN changes the internal page index (page number) and subsequently recorded ink is then associated with the new page. The system then records the new page identifier data. If the user fails to advance the page number, however, the user can overwrite recorded ink when the user begins writing on a new piece of paper.

This problem can be avoided by a method in accordance with the present invention whereby the system detects when the user is writing near the bottom of a page and then causes the LCD to flash a warning message or otherwise advise the user to advance the page number. Alternatively, the system can be configured to automatically advance the page number using positional information. In particular, the system may be configured to advance the page number when a large change in the Y position of the stylus is detected (such as when the user stops writing on the bottom of the page and moves the pen to, or begins to write, on the top of the page). In addition, the system can be configured to flash a message on the display or generate a tone signal to advise the user that the page number has been, will be or should be, automatically advanced.

In summary, the various methods described above for visually displaying page information such as ink content and or ink structure of a digital page advantageously allow detailed page information to be displayed, notwithstanding the size constraints of the LCD. As such, a user can easily synchronize a handwritten page with a stored digital page in the PDN.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for displaying page information in a handwriting recording device having an electronic inking stylus, a digitizing tablet and a display associated therewith, wherein the device records stroke data in one or more digital pages representing handwritten strokes concurrently produced on a writing medium placed over the digitizing tablet using the electronic inking stylus, the method comprising the steps of:

selecting at least one of a plurality of display mode functions;

selecting at least one digital page stored in the device; and displaying page information for the selected digital page in accordance with the selected display mode function such that the displayed page information allows a user to visually synchronize a handwritten page corresponding with the selected digital page, wherein the display mode functions comprise a function for displaying a positional location of the stylus in proximity to the digitizing tablet.

2. The method of claim 1, wherein the display mode functions include a function for displaying a thumbnail icon of the selected digital page.

3. The method of claim 2, wherein the step of displaying page information in accordance with the thumbnail icon display mode function includes the steps of:

generating a scaled-down version of the handwriting data content of the selected digital page; and displaying the scaled-down version in the thumbnail icon, wherein the displayed scaled-down version shows the structure of the handwriting data content of the digital page.

4. The method of claim 3, wherein the step of generating a scaled-down version of the handwriting data content of the selected digital page includes the steps of:

designating a predetermined number of pixels of the display for displaying a thumbnail icon;

assigning each designated pixel of the thumbnail icon to a designated area of the digital page, wherein each designated area of the digital page is associated with a predetermined number of coordinates; and processing positional data recorded on the selected digital page to determine coordinates having recorded handwriting data.

5. The method of claim 4, wherein the step of displaying the scaled-down version in the thumbnail icon includes the steps of:

activating each pixel of the thumbnail icon having a designated area with coordinates determined to have recorded handwriting data.

6. The method of claim 4, wherein the step of processing positional data recorded on the selected digital page to determine coordinates having recorded handwriting data includes the step of tallying the number of coordinates in each designated area having recorded handwriting data.

7. The method of claim 6, wherein the step of displaying the scaled-down version in the thumbnail icon includes the steps of:

activating each pixel of the thumbnail icon having a designated area with coordinates determined to have recorded handwriting data, wherein each pixel is activated in accordance with a gray scale factor based on a percentage of the predetermined number of coordinates in the corresponding designated area having recorded handwriting data.

8. The method of claim 1, wherein the display mode functions include a panning mode function for displaying a panning view of the handwriting data recorded on a portion of the selected digital page which corresponds to the detected location of the stylus in proximity to the digitizing tablet.

9. The method of claim 8, wherein the step of displaying page information in accordance with the panning mode function to synchronize a handwritten page with a digital page includes the steps of:

placing the handwritten page on the digitizing tablet;

moving the electronic stylus over the handwritten page while continuously detecting the location of the stylus;

displaying an image of the handwriting data on the selected digital page which corresponds to the detected location of the stylus; and visually comparing the displayed handwriting image with the handwriting on the handwritten page in proximity to the stylus to determine if the selected digital page corresponds to the handwritten page.

10. The method of claim 1, wherein the display mode functions include a function for displaying a predetermined number of recorded strokes at the beginning of the selected digital page.

11. The method of claim 1, wherein the display mode functions include a function for displaying a predetermined number of recorded strokes at the end of the selected digital page.

12. The method of claim 1, wherein the display mode functions include a function for displaying the number of recorded strokes on the selected digital page.

13. The method of claim 1, wherein the display mode functions include a function for displaying one of at least one recorded keyword on the selected page, the amount of recorded keywords on the selected page, and a combination thereof.

14. The method of claim 1, wherein the display mode functions include a function for displaying the number of designated bookmarks for the selected page.

15. The method of claim 1, wherein the display mode functions include a function for displaying a bitmap image of a handwritten page identifier which is recorded within a designated area of the selected digital page.

16. The method of claim 1, wherein the display mode functions include a function for simultaneously displaying a positional location of the stylus in proximity to the digitizing tablet and a positional location of a previously stored location such that the user can align the position of the stylus with the stored position.

17. The method of claim 1, wherein the display mode functions include a function for displaying a warning message to the user to advance a page number when the device detects that the user is writing in proximity to the bottom of the writing medium.

18. The method of claim 17, wherein the device automatically advances the page number upon detecting a predetermined change of position of the stylus.

19. A system for displaying page information in a handwriting recording device having an electronic inking stylus, a digitizing tablet and a display associated therewith, wherein the device records stroke data in one or more digital pages representing handwritten strokes concurrently produced on a writing medium placed over the digitizing tablet using the electronic inking stylus, the system comprising:

means for selecting at least one of a plurality of display mode functions;

means for selecting at least one digital page stored in the device; and means for displaying page information for the selected digital page in accordance with the selected display mode function such that the displayed page information allows a user to visually synchronize a handwritten page corresponding with the selected digital page, wherein the display mode functions comprise a panning mode function comprising means for displaying a panning view of the handwriting data recorded on a portion of the selected digital page which corresponds to the detected location of the stylus in proximity to the digitizing tablet.

20. The system of claim 19, wherein the display mode functions include means for displaying a thumbnail icon of the selected digital page.

21. The system of claim 20, wherein the means for displaying the thumbnail icon comprises:

means for generating a scaled-down version of the handwriting data content of the selected digital page; and means for displaying the scaled-down version in the thumbnail icon, wherein the displayed scaled-down version shows the structure of the handwriting data content of the digital page.

22. The system of claim 21, wherein the means for generating a scaled-down version of the handwriting data content of the selected digital page comprises:

means for designating a predetermined number of pixels of the display for displaying a thumbnail icon;

means for assigning each designated pixel of the thumbnail icon to a designated area of the digital page, wherein each designated area of the digital page is associated with a predetermined number of coordinates; and means for processing positional data recorded on the selected digital page to determine coordinates having recorded handwriting data.

23. The system of claim 22, wherein the means for displaying the scaled-down version in the thumbnail icon comprises:

means for activating each pixel of the thumbnail icon having a designated area with coordinates determined to have recorded handwriting data.

24. The system of claim 22, wherein the means for processing positional data recorded on the selected digital page to determine coordinates having recorded handwriting data comprises means for tallying the number of coordinates in each designated area having recorded handwriting data.

25. The system of claim 24, wherein the means for displaying the scaled-down version in the thumbnail icon comprises:

means for activating each pixel of the thumbnail icon on having a designated area with coordinates determined to have recorded handwriting data, wherein each pixel is activated in accordance with a gray scale factor based on a percentage of the predetermined number of coordinates in the corresponding designated area having recorded handwriting data.

26. The system of claim 19, wherein the display mode functions include means for displaying a predetermined number of recorded strokes at the beginning of the selected digital page.

27. The system of claim 19, wherein the display mode functions include means for displaying a predetermined number of recorded strokes at the end of the selected digital page.

28. The system of claim 19, wherein the display mode functions include means for displaying the number of recorded strokes on the selected digital page.

29. The system of claim 19, wherein the display mode functions include means for displaying one of at least one recorded keyword on the selected page, the amount of recorded keywords on the selected page, and a combination thereof.

30. The system of claim 19, wherein the display mode functions include means for displaying the number of designated bookmarks for the selected page.

31. The system of claim 19, wherein the display mode functions include means for displaying a bitmap image of a handwritten page identifier which is recorded within a designated area of the selected digital page.

32. The system of claim 19, wherein the display mode functions include means for displaying the positional location of the stylus in proximity to the digitizing tablet.

33. The system of claim 19, wherein the display mode functions include means for simultaneously displaying a positional location of the stylus in proximity to the digitizing tablet, a positional location of a previously stored location, and at least one arrow, such that the user can move the stylus in a direction indicated by the displayed arrow to align the position of the stylus with the stored position.

34. The system of claim 19, wherein the display mode functions include means for displaying a warning message to the user to advance a page number when the device detects that the user is writing in proximity to the bottom of the writing medium.

35. The system of claim 34, wherein the warning message display means further includes means for detecting a predetermined change of position of the stylus and means for automatically advancing the page number if the predetermined change of position is detected.

36. A program storage device readable by a machine, tangibly embodying a program of instructions executable by the machine to perform method steps for displaying page information in a handwriting recording device having an electronic inking stylus, a digitizing tablet and a display associated therewith, wherein the device records stroke data in one or more digital pages representing handwritten strokes concurrently produced on a writing medium placed over the digitizing tablet using the electronic inking stylus, the method comprising the steps of:

selecting at least one of a plurality of display mode functions;

selecting at least one digital page stored in the device; and displaying page information for the selected digital page in accordance with the selected display mode function such that the displayed page information allows a user to visually synchronize a handwritten page corresponding with the selected digital page, wherein the display mode functions comprise a function for displaying a warning message to the user to advance a page number when the device detects that the user is writing in proximity to the bottom of the writing medium.

37. A program storage device readable by a machine, tangibly embodying a program of instructions executable by the machine to perform method steps for displaying page information in a handwriting recording device having an electronic inking stylus, a digitizing tablet and a display associated therewith, wherein the device records stroke data in one or more digital pages representing handwritten strokes concurrently produced on a writing medium placed over the digitizing tablet using the electronic inking stylus, the method comprising the steps of:

selecting at least one of a plurality of display mode functions;

selecting at least one digital page stored in the device; and displaying page information for the selected digital page in accordance with the selected display mode function such that the displayed page information allows a user to visually synchronize a handwritten page corresponding with the selected digital page, wherein the display mode functions comprise a function for simultaneously displaying a positional location of the stylus in proximity to the digitzing tablet and a positional location of a previously stored location such that the user can align the position of the stylus with the stored position.

\* \* \* \* \*